United States Patent
Shimizu et al.

(10) Patent No.: US 9,483,037 B2
(45) Date of Patent: Nov. 1, 2016

(54) MOTOR CONTROL DEVICE, METHOD FOR OPERATING THE SAME, AND IMAGE PROCESSING APPARATUS

(71) Applicants: Fumihiro Shimizu, Kanagawa (JP); Takuya Murata, Tokyo (JP)

(72) Inventors: Fumihiro Shimizu, Kanagawa (JP); Takuya Murata, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 238 days.

(21) Appl. No.: 13/904,412

(22) Filed: May 29, 2013

(65) Prior Publication Data
US 2013/0325187 A1    Dec. 5, 2013

(30) Foreign Application Priority Data

Jun. 1, 2012   (JP) ................. 2012-125698
Apr. 12, 2013  (JP) ................. 2013-084295

(51) Int. Cl.
  G05B 19/40  (2006.01)
  G05B 15/02  (2006.01)
  G05B 19/19  (2006.01)

(52) U.S. Cl.
  CPC .......... *G05B 15/02* (2013.01); *G05B 19/19* (2013.01); *G05B 2219/41437* (2013.01)

(58) Field of Classification Search
  CPC ........................................... G05B 15/02
  USPC ........................................ 318/560, 671, 685
  See application file for complete search history.

(56) References Cited

U.S. PATENT DOCUMENTS

| | | | |
|---|---|---|---|
| 5,477,302 A | 12/1995 | Ogasawara | |
| 6,418,274 B2* | 7/2002 | Tanaka | B41J 11/42 318/600 |
| 7,026,779 B2* | 4/2006 | Eba | 318/609 |
| 7,208,902 B2* | 4/2007 | Yamane | 318/600 |
| 7,208,905 B2* | 4/2007 | Shibatani | H02P 8/34 318/685 |
| 7,576,509 B2* | 8/2009 | Komatsu et al. | 318/567 |
| 7,746,023 B2* | 6/2010 | Ajima | H02P 6/10 318/700 |
| 7,821,216 B2* | 10/2010 | Akiyama | H02P 23/20 318/432 |
| 9,106,164 B2 | 8/2015 | Seki et al. | |

FOREIGN PATENT DOCUMENTS

| | | |
|---|---|---|
| JP | 05-313059 | 11/1993 |
| JP | 08-030311 | 2/1996 |
| JP | 2001-219613 | 8/2001 |
| JP | 2005-086956 | 3/2005 |
| JP | 2008-118822 | 5/2008 |
| JP | 2011-044006 | 3/2011 |
| JP | 2013-162694 A | 8/2013 |
| JP | 5487910 B2 | 5/2014 |

OTHER PUBLICATIONS

"2-Phase Stepping Motor Driver", URL: http://www.sanyosemi.com/jp/search/property.php?clcd=81&prod=STK672-632A-E, SANYO Semiconductor Co., Ltd., May 24, 2013(Retrieval Date), 21 pages.

* cited by examiner

*Primary Examiner* — David S Luo
(74) *Attorney, Agent, or Firm* — Oblon, McClelland, Maier & Neustadt, L.L.P.

(57) ABSTRACT

A motor control device includes: a unit configured to generate a target rotation position information of a first driving motor based on target rotation position signals indicating a target rotation position of a second driving motor being replaced with the first driving motor; a unit configured to generate a speed predicting of the first driving motor; a unit configured to detect a rotation position of the first driving motor; a unit configured to generate an actual position information of the first driving motor; a unit configured to generate an actual speed of the first driving motor; a unit configured to correct an error between the target rotation position and the actual rotation position of the first driving motor; a unit configured to generate a speed error signal; a unit configured to generate a speed control signals of the first driving motor; and a unit configured to output a drive voltage.

19 Claims, 8 Drawing Sheets

MOTOR CONTROL DEVICE, METHOD FOR OPERATING THE SAME, AND IMAGE PROCESSING APPARATUS

CROSS REFERENCE TO RELATED APPLICATION

The present application claims a benefit of priority to and incorporates by reference the entire contents of Japanese Patent Application No. 2012-125698 filed in Japan on Jun. 1, 2012 and Japanese Patent Application No. 2013-084295 filed in Japan on Apr. 12, 2013.

BACKGROUND OF THE INVENTION

1. Field of the Invention

The present invention relates to a motor control device, an image processing apparatus, and a motor control method.

2. Description of the Related Art

In image processing apparatus, a stepping motor has been widely used for a part where a rotation position control is required. The stepping motor can easily achieve rotation position control.

Conventionally, a drive efficiency of the stepping motor has been low. Therefore, instead of the stepping motor, a motor configured to utilize a permanent magnet as a stator and a coil as a rotor has been used for some components. As an example of the motor, a direct current (DC) motor has been known. The DC motor generates a rotating force with a magnetic attractive force or a magnetic repulsive force generated by alternating direction of a current flowing into the rotor (see Japanese Patent Laid-open Publication No. H5-313059, which is incorporated herein by reference).

However, a drive control of the stepping motor is different from that of the DC motor. Thus, when a component driven by the stepping motor is driven by the DC motor (i.e., when the stepping motor is replaced with the DC motor), it is necessary to detect a rotation position of a rotation shaft of the DC motor and perform position control. This leads to a duty of an accurate motor control.

Generally, the position information of the rotation shaft of the DC motor is obtained as pulse signals through an encoder. The obtained position information is formed of a discrete value. The speed information calculated by differentiating the position information provides a pulse-like waveform. The control operation based on the speed information leads deterioration of accuracy of motor control. When a control unit implements a discrete system, missing of feedback information occurs due to aliasing signal processing, so that further it leads the deterioration of accuracy of motor control.

Therefore, there is a need for a motor control device, an image processing apparatus, and a motor control method that can prevent the deterioration of accuracy of motor control associated with replacement of motors.

SUMMARY OF THE INVENTION

According to an aspect of the invention, a motor control device is provided. The motor control device includes: a unit configured to generate target rotation position information of a first driving motor based on target rotation position signals indicating a target rotation position of a second driving motor, the second driving motor being replaced with the first driving motor; a unit configured to generate speed prediction information of the first driving motor based on the target rotation position information; a unit configured to detect a rotation position of the first driving motor and outputs rotation position information; a unit configured to generate actual position information indicating an actual rotation position of the first driving motor based on the rotation position information; a unit configured to generate actual speed information indicating an actual rotation speed of the first driving motor based on the actual position information; a unit configured to generate target speed information indicating a target rotation speed for correcting an error between the target rotation position and the actual rotation position of the first driving motor based on the target rotation position information and the actual position information; a unit configured to generate speed error signals indicating an error between the target rotation speed and the actual rotation speed of the first driving motor based on the target speed information, the speed prediction information, and the actual speed information; a unit configured to smooth the speed error signals and generate smoothed speed error signals; a unit configured to generate speed control signals representing drive signals of the first driving motor based on the smoothed speed error signals; and a unit configured to output drive voltage in accordance with the speed control signals to the first driving motor.

The above and other objects, features advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

In the following, embodiments of the motor control device, the image processing apparatus, and the motor control method are described with reference to drawings.

Figure 1:
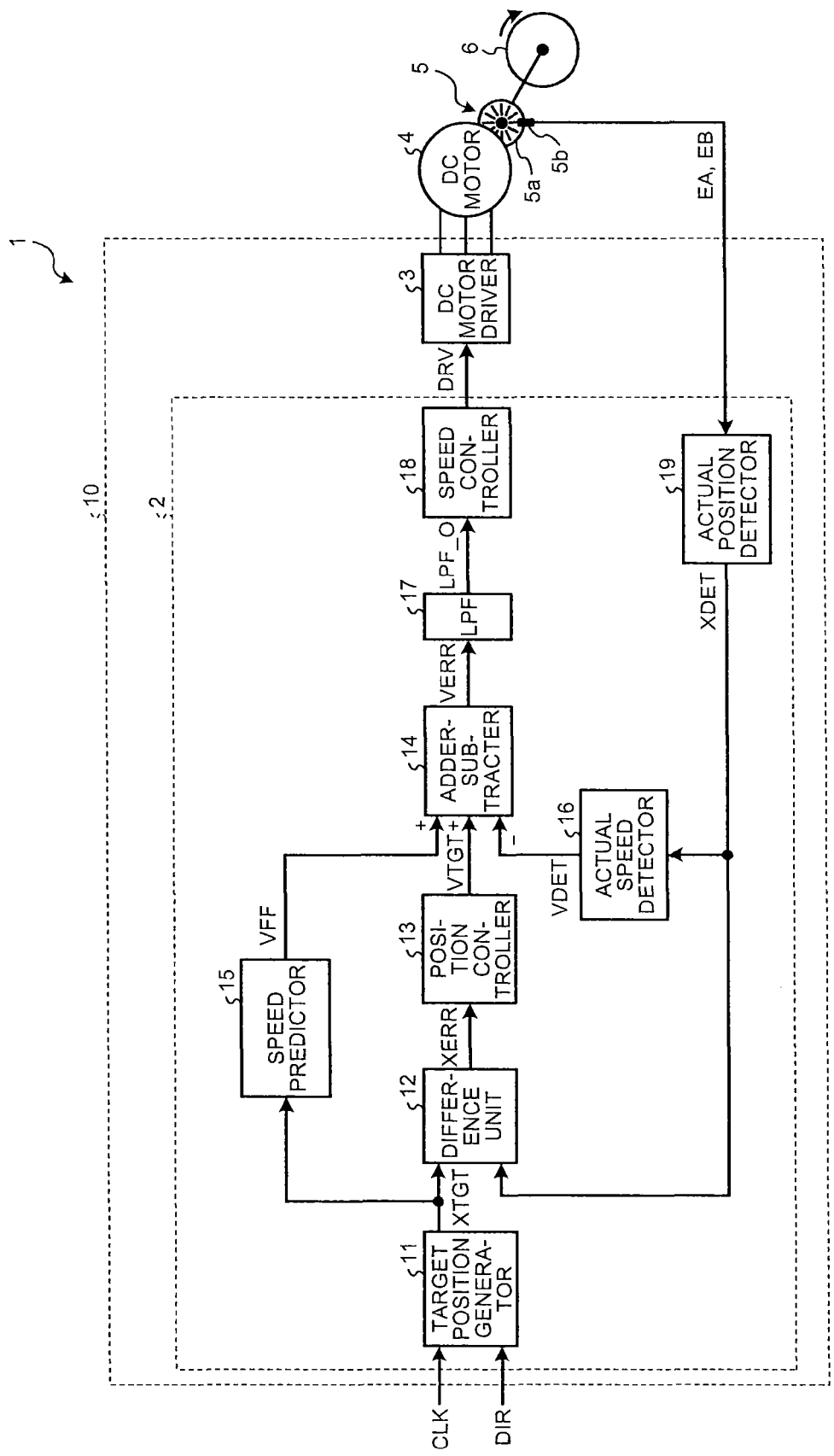
FIG. 1 is a schematic system configuration diagram of a motor drive system according to an embodiment of the present invention.

FIG. 1 shows a system configuration of a motor drive system 1 according to an embodiment. FIG. 1 illustrates the motor drive system configuration applicable to an image processing apparatus, for example a household electrical appliance, an office automation (OA) device, a multifunction peripheral, a copying machine, a facsimile, a printer, and a scanner. The image processing apparatus employing the motor drive system 1 of the embodiment operates a drive mechanism using a replaced rotation of a DC motor 4 that is controlled by a motor control device 10, and performs image processing.

The motor drive system 1 of the embodiment is provided with a motor control unit 2, a DC motor driver 3, the DC motor 4, and an encoder 5 as illustrated in FIG. 1. The motor control device 10 of the embodiment includes the motor control unit 2, and the DC motor driver 3.

The rotation shaft of the DC motor 4 rotates in accordance with drive voltage applied to a coil terminal. A component 6 in a rotor of an image processing apparatus (for example, a component in a drive mechanism of a device employing the motor drive system 1) is driven by the rotation shaft. Prior to replacement, the stepping motor (e.g. pulse driving motor) rotates in accordance with the number of pulses. On the other hand, subsequent to replacement, the DC motor 4 rotates in accordance with drive voltage applied thereto.

The DC motor driver 3 applies to a coil terminal of the DC motor 4 drive voltage in accordance with drive signals DRV that has been input from the motor control unit 2 to let the shaft of the DC motor 4 rotate to a target rotation position. As the example of the DC motor 4, there are a brush DC motor having a commutator and a brushless DC motor in which the DC motor driver 3 has a commutation function. The rotation shaft of the DC motor 4 rotates when a drive voltage is applied to the coil terminal of the DC motor 4 by the DC motor driver 3.

The encoder 5 is connected to the rotation shaft of the DC motor 4. The encoder 5 is provided with a disk 5a in which a plurality of slits for a optical window are formed on the surface of outside plane with equal pitch, and a photointerruptor 5b that is disposed away from the disk 5a with a predetermined distance that is ¼ of the pitch, for example. The photointerrupter 5b outputs to the motor control unit 2 biphase pulse signals EA and EB obtained by binarizing output signals. The biphase pulse signals EA and EB represent rotation position information indicating an actual rotation position of the DC motor 4.

The motor control unit 2 includes a target position generator 11, a difference unit 12, a position controller 13, an adder/subtractor 14, a speed predictor 15, an actual speed detector 16, a low-pass filer (LPF) 17, a speed controller 18, and an actual position detector 19. The motor control unit 2 includes an arithmetic unit (not shown) such as a microcomputer and an application specific integrated circuit (ASIC).

The motor control unit 2 generates a target rotation position for the DC motor 4 after replacement is completed, detects an actual rotation position of the DC motor 4 after replacement is completed, and performs control operation. The motor control unit 2 performs the above-mentioned operations based on a target rotation position signal for the stepping motor before replacement is completed and the actual rotation position information of the DC motor 4. Thus, the motor control unit 2 outputs to the motor driver 3 drive signals DRV that instructs the voltage value to be applied to the coil terminal of the DC motor 4 such that the rotation position θ of the rotation shaft of the DC motor 4 can be set as the target rotation position.

Figure 2:
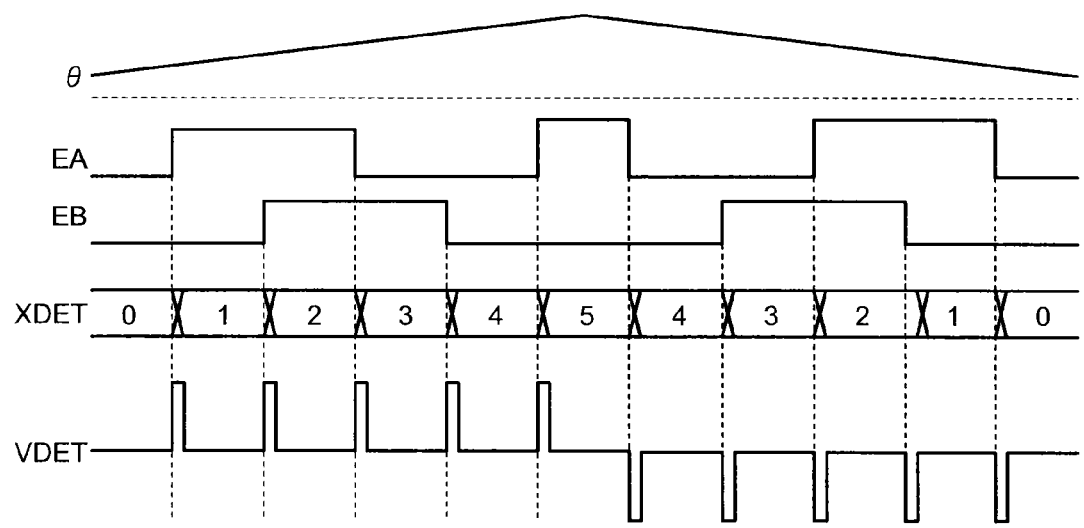
FIG. 2 is an exemplary timing chart for explaining actual position detecting processing operated in the embodiment illustrated in FIG. 1.

The encoder 5 outputs the two pulse signals EA and EB indicating the actual rotation position of the DC motor 4 to the actual position detector 19. Then, the actual position detector 19 performs processing illustrated in FIG. 2. FIG. 2 shows actual position detecting process according to the embodiment. As illustrated in FIG. 2, the actual position detector 19 generates actual position information XDET that represent a count value corresponding to the rotation position θ of the rotation shaft of the DC motor 4, from the edges of biphase pulse signals EA and EB and the phase relation therebetween. The actual position detector 19 detects the actual rotation position of the DC motor 4 after replacement is completed. Thereafter, the actual position detector 19 outputs the generated actual position information XDET to the actual speed detector 16 and the difference unit 12. Thus, the actual position detector 19 of the embodiment represents one gain circuit with a predetermined amplification width, which converts the rotation position θ of the rotation shaft of the DC motor 4 from the form of biphase pulse signals EA and EB into data of actual position information XDET.

Returning to FIG. 1, for example, a processor (not illustrated) provided with the image processing unit outputs target rotation position signals for the stepping motor before replacement is completed to the target position generator 11. The target rotation position signals represent signals indicating a target rotation position of the rotation position θ of the rotation shaft of the stepping motor before replacement is completed. More specifically, the target rotation position signals represent a plurality of pulse signal sequences in which a plurality of pulse signals with time domain are combined. The plurality of pulse signals include pulse signals CLK indicating, with the number of pulses, a variation amount of the target rotation position, and direction signals DIR indicating a variation direction of the variation amount of the target rotation position. Thus, the target position generator 11 receives a plurality of pulse signal sequences in which pulse signals CLK and direction signals DIR are combined, as target rotation position signals for the stepping motor before replacement is completed. Then, the target position generator 11 generates target rotation position information XTGT indicating a target rotation position for the DC motor 4 after replacement is completed, from the target rotation position signals for the stepping motor before replacement is completed.

Figure 3:
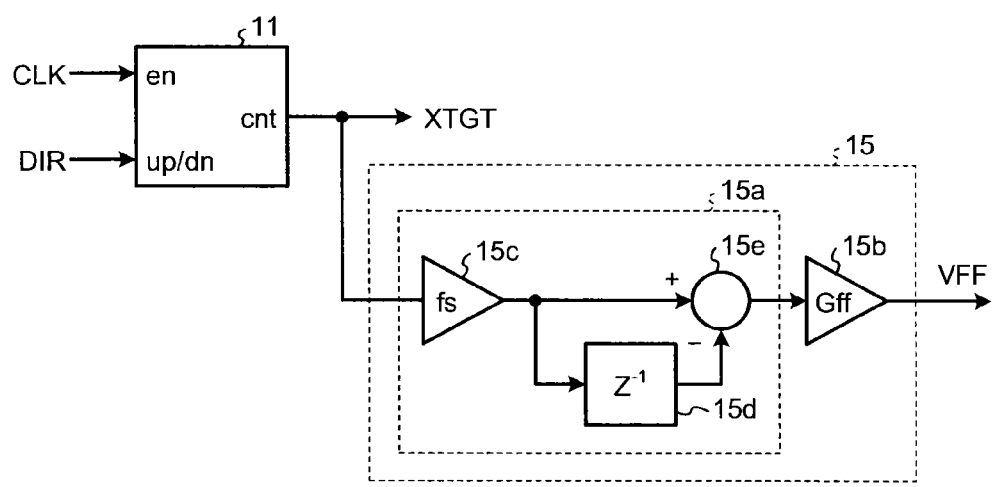
FIG. 3 is a circuit diagram of a target position generator and a speed predictor in the embodiment illustrated in FIG. 1.
Figure 4:
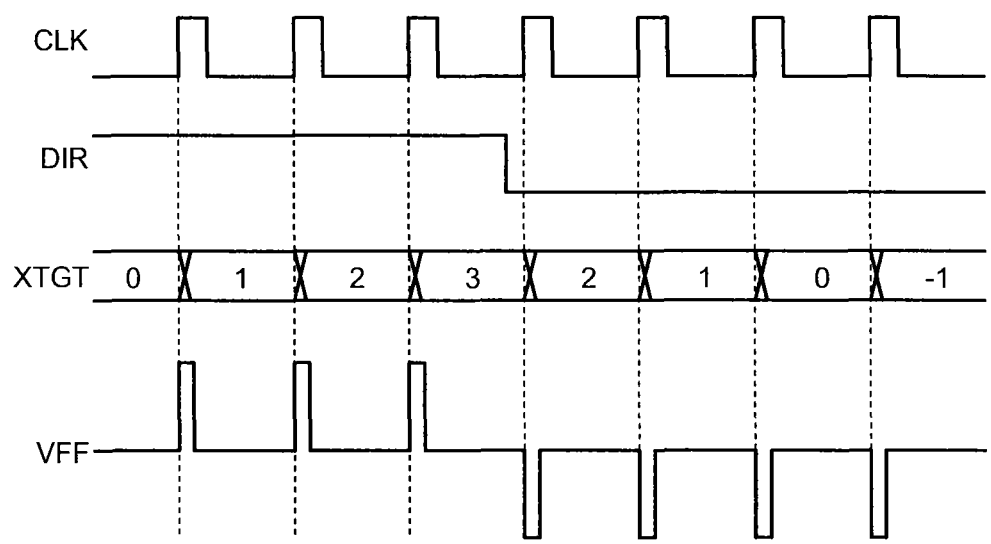
FIG. 4 is an exemplary timing chart for explaining processing for generating target rotation position information and speed prediction information of a DC motor in the embodiment illustrated in FIG. 1.

FIG. 3 shows the target position generator 11 and the speed predictor 15 of the embodiment. FIG. 4 shows process for generating the target rotation position information XTGT and the speed prediction information VFF of the DC motor 4 of the embodiment. The target position generator 11 includes a counter as illustrated in FIG. 3. As illustrated in FIG. 4, the target position generator 11 performs upcount leading edges of the pulse signals CLK in accordance with high (H) of the direction signals DIR, and performs downcount the leading edges of the pulse signal CLK in accordance with low (L) of the direction signals DIR. The target position generator 11 sets the count result as target rotation position information XTGT for the DC motor 4 after replacement is completed. More specifically, the target position generator 11 determines a variation direction of the variation amount of the target rotation position based on values of pulse signals (i.e., H/L of direction signals DIR) in a predetermined pulse signal sequence among a plurality of pulse signal sequences of target rotation position signals (i.e., signal sequences in which pulse signals CLK and direction signals DIR are combined) for the stepping motor. The target position generator 11 counts the number of pulse signals CLK in other pulse signal sequences during a variation direction being stable based on the determination result, and generates target rotation position information XTGT for the DC motor 4 by setting the count value as a variation amount of target rotation position. The target position generator 11 generates target rotation position information XTGT for the DC motor 4. Thereafter, the target position generator 11 outputs the target rotation position information XTGT for the DC motor 4 to the difference unit 12 and the speed predictor 15. Thus, the target position generator 11 of the embodiment represents the gain one counter, with a predetermined amplification width, that converts the target rotation position from the form of pulse signal CLK and direction signal DIR into data of target rotation position information XTGT.

The speed predictor 15 includes a differentiator 15a and an amplifier 15b as illustrated in FIG. 3, for example. The differentiator 15a differentiates the target rotation position information XTGT that has been input from the target position generator 11. The differentiator 15a may include an amplifier 15c, a delay circuit 15d, and a subtractor 15e. The amplifier 15c multiplies the target rotation position information XTGT by a value of a sampling frequency fs, and outputs the multiplied value to the subtractor 15e. The delay circuit 15d delays the multiplied value by time period corresponding to one sample and outputs it to the subtractor 15e. The subtractor 15e calculates a difference between the multiplied value before delaying by time period corresponding to one sample and the current multiplied value. As a result, the differentiator 15a outputs the difference value to the amplifier 15b. Then, the amplifier 15b multiplies the difference value by a value of an FF gain Gff to generate speed prediction information VFF using the multiplied value, and outputs the generated speed prediction information VFF to the adder/subtractor 14. The $Z^{-1}$ illustrated in FIG. 3 represents that the multiplied value obtained by multiplying the target rotation position information XTGT by the value of the sampling frequency fs is delayed by time period corresponding to one sample. The target rotation position information XTGT consists of a discrete value generated based on the count result of the number of pulses as illustrated in FIG. 4. Thus, the value of the speed prediction information VFF obtained by differentiating the discrete value varies in a pulse-like manner, as above-mentioned.

Figure 5:
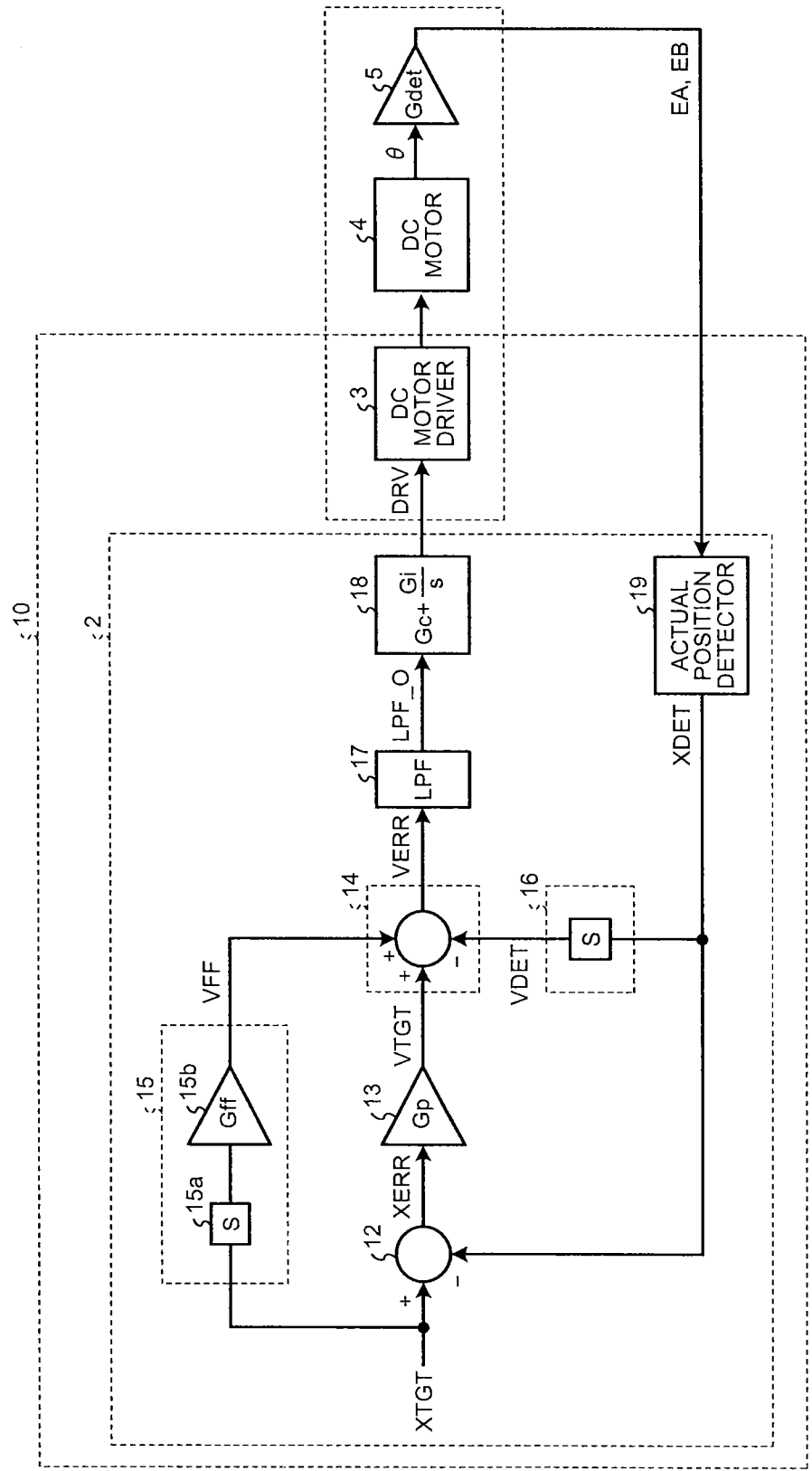
FIG. 5 is a schematically constitutional block diagram of the embodiment illustrated in FIG. 1.

FIG. 5 specifically shows the main portion of the motor control device 10 of the embodiment. The difference unit 12 includes a subtractor as illustrated in FIG. 5. The difference unit 12 calculates a difference between the target rotation position information XTGT that has been input from the target position generator 11 and the actual position information XDET that has been input from the actual position detector 19. As a result, the difference unit 12 sets the difference value as position error information XERR that indicates an error between the target rotation position and the actual rotation position. The difference unit 12 outputs the position error information XERR to the position controller 13.

The position controller 13 includes an amplifier as illustrated in FIG. 5. The position controller 13 multiplies the position error information XERR that has been input from the difference unit 12 by a position gain Gp, and sets the multiplied value as target speed information VTGT indicating a target rotation speed for correcting the erroneous difference between the target rotation position and the actual rotation position. Thereafter, the position controller 13 outputs the target speed information VTGT to the adder/subtractor 14. In the embodiment, the difference unit 12 together with the position controller 13 functions as a position control unit.

The actual speed detector 16 has the substantially same configuration as the speed predictor 15, as illustrated in FIG. 5. The actual speed detector 16 differentiates the actual position information XDET that has been input from the actual position detector 19 to generate actual speed information VDET using the results of the differentiation operation and output the generated actual speed information VDET to the adder/subtractor 14.

As illustrated in FIG. 5, the adder/subtractor 14 adds the target speed information VTGT that has been input from the position controller 13, adds the speed prediction information VFF that has been input from the speed predictor 15, and subtracts the actual speed information VDET that has been input from the actual speed detector 16. That is, the adder/subtractor 14 may selectively add and subtract the target speed information VTGT, the speed prediction information VFF, and the actual speed information VDET. As a result, the adder/subtractor 14 sets added/subtracted value as speed error information VERR indicating erroneous difference between the target rotation speed and the actual rotation speed. Thereafter, the adder/subtractor 14 outputs the speed error information VERR to the LPF 17. Here, the adder/subtractor 14 may not perform the addition of the speed prediction information VFF to omit the function of feed forward compensation that may be unnecessary in some use.

Figure 6:
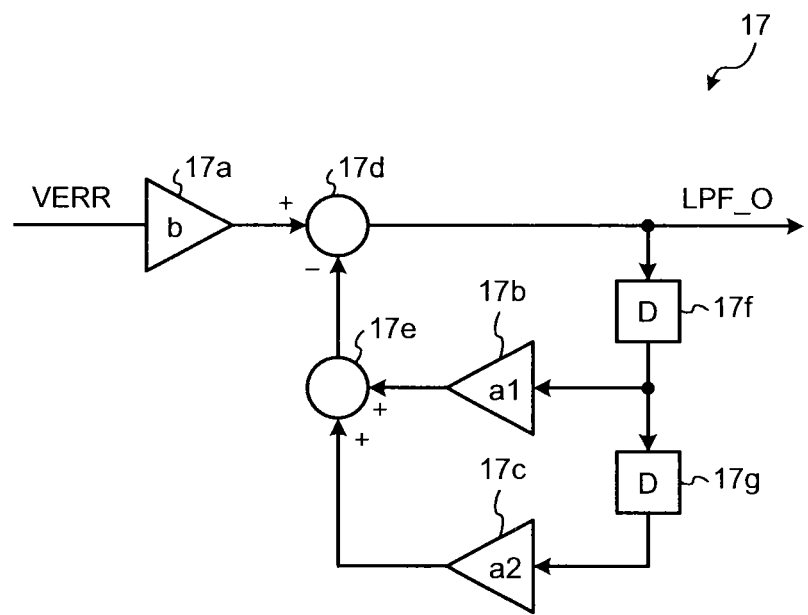
FIG. 6 is a schematic circuit diagram of a low-pass filter (LPF) in the embodiment illustrated in FIG. 1.
Figure 7:
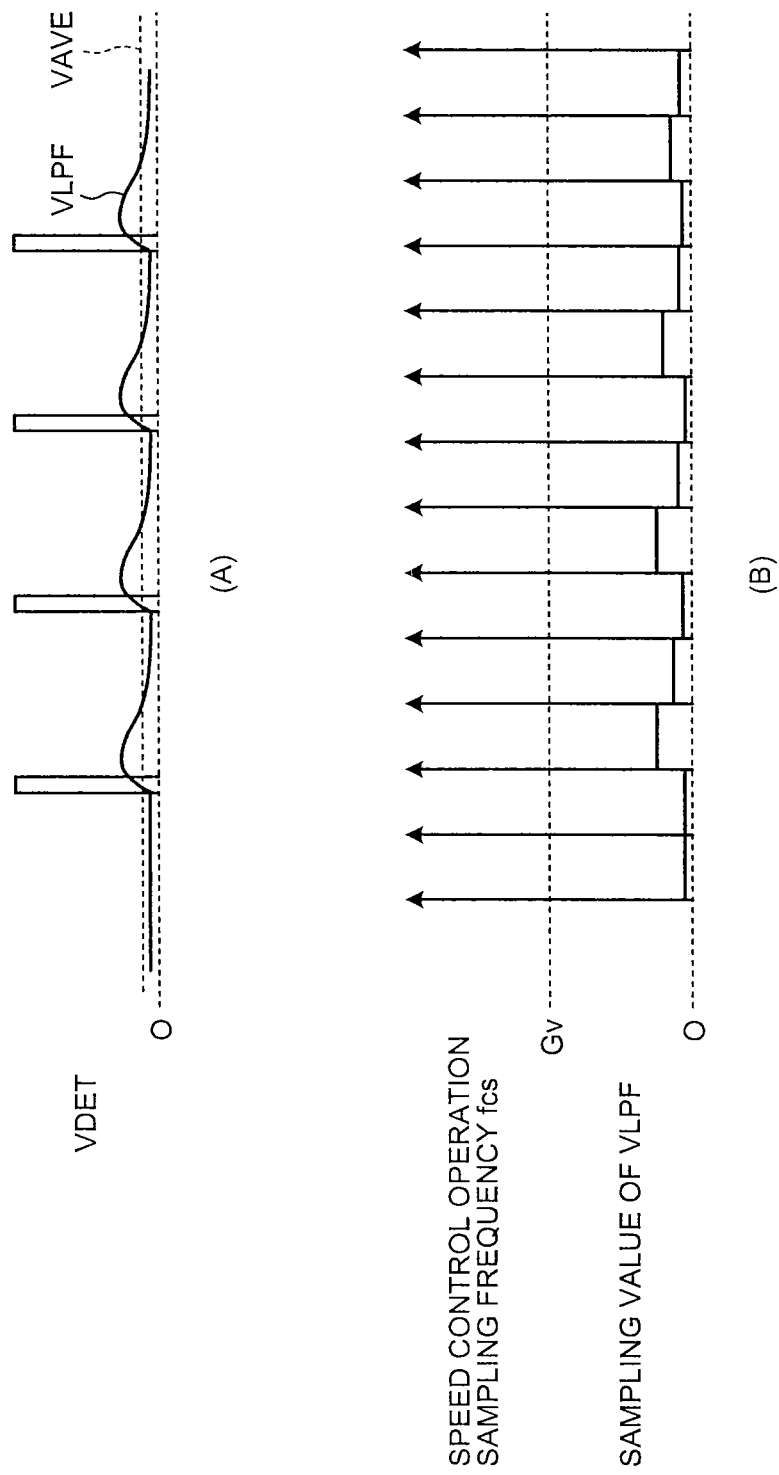
FIGS. 7A and 7B are exemplary timing charts for explaining filtering with the LPF illustrated in FIG. 6.

FIG. 6 shows an exemplary circuit of the LPF 17 of the embodiment. FIGS. 7A and 7B show filtering with the LPF 17 of the embodiment. The LPF 17 includes, for example, amplifiers 17a to 17c, an adder/subtractor 17d, an adder 17e, and diodes 17f and 17g as illustrated in FIG. 6. The LPF 17 may be a general lowpass filter, and smooth the speed error information VERR that has been input from the adder/subtractor 14, and outputs filtered output LPF_O to the speed controller 18.

The LPF 17 receives the speed error information VERR as a pulse-like varying waveform. Thus, if the rotation speed of the DC motor 4 is controlled as is by the speed controller 18, the accuracy of motor control is deteriorated. Then, in the motor control device 10 of the embodiment, filtering by smoothing the speed error information VERR through the LPF 17 prevents the deterioration of accuracy of motor control due to replacement of motors (i.e., replacing the stepping motor with the DC motor 4).

Preferably, the actual speed information VDET that is a basis of the speed error information VERR may be detected at a constant value, for example an average value VAVE illustrated with a dotted line in FIG. 7A, when the rotation shaft of the DC motor 4 rotates at a certain speed, as illustrated in FIGS. 7A and 7B. However, the actual speed information VDET varies in a pulse-like manner with same intervals as illustrated in FIG. 7A. The average value VAVE represents an average value of the actual speed information VDET and VLPF indicating filtered actual speed information VDET.

Thus, when the LPF 17 is not provided prior to the speed controller 18, the calculation result of speed control is periodically subject to input signals that vary in a pulse-like manner. This leads the deterioration of the control accuracy of the rotation shaft θ by the speed controller 18.

The pulse width of the actual speed information VDET is an inverse of the sampling frequency fs, 1/fs. Thus, when the pulse width of the actual speed information VDET is not sufficiently long relative to the speed control operation execution cycle 1/fcs, the missing of feedback information occurs due to aliasing in sampling as illustrated in FIG. 7B for example. This leads the deterioration of accuracy of motor control. The fcs represents a sampling frequency of speed control operation.

The LPF 17 smooths the actual speed information VDET that varies in a pulse-like manner through filtering, so that a VLPF is generated as illustrated in FIG. 7A. The motor control device 10 of the embodiment allows the LPF 17 to mitigate steep angle of a waveform of the actual speed information VDET, so that the deterioration of control accuracy of the rotation shaft θ due to the periodical disturbance of a speed control calculation result is prevented. The motor control device 10 of the embodiment can prevent missing of feedback information due to aliasing in sampling, so that the deterioration of accuracy of motor control is prevented.

Figure 8:
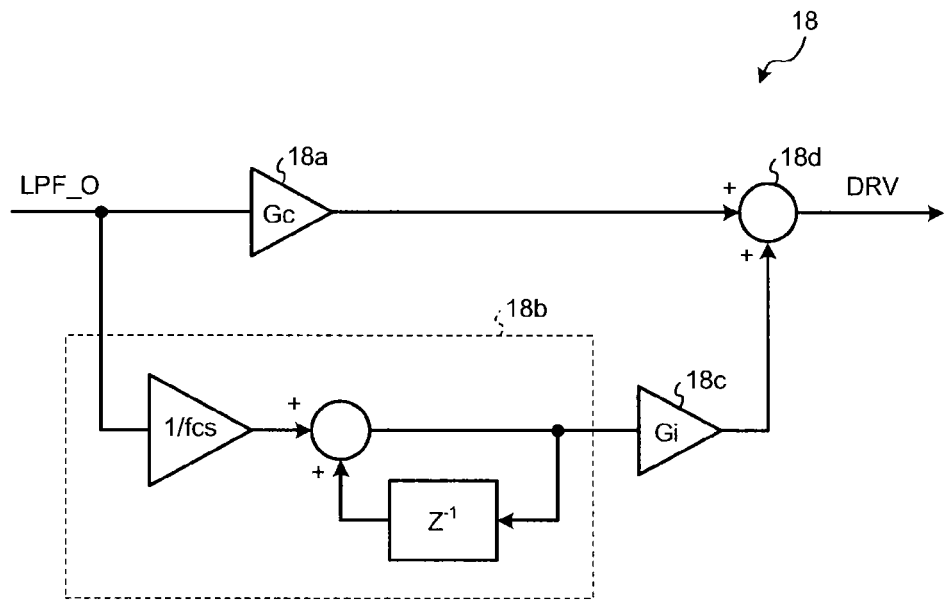
FIG. 8 is a schematic circuit diagram of a speed controller in the embodiment illustrated in FIG. 1.

In the embodiment, the speed error information VERR obtained by adding and subtracting the target speed information VTGT, the speed prediction information VFF, and the actual speed information VDET is filtered with the single LPF 17. Thus, similar to the actual speed information VDET, the motor control device 10 of the embodiment can suppress the influence of all signals that include the speed prediction information VFF and the actual speed information VDET in which that the value thereof varies in a pulse-like manner, so that the deterioration of accuracy of motor control is prevented. The motor control device 10 of the embodiment can prevent, with small-scale circuit, the deterioration of accuracy of motor control associated with replacement of motors FIG. 8 shows an exemplary circuit of the speed controller 18 of the embodiment. As illustrated in FIG. 8, the speed controller 18 includes, for example, an amplifier 18a, an integrator 18b, an amplifier 18c, and an adder 18d. The speed controller 18 represents a proportional integral (PI) controller. The amplifier 18a multiplies the filter output LPF_O that has been input from the LPF 17 by a speed proportional gain Gc, and outputs the multiplied value to the adder 18d as control system output. The integrator 18b multiplies the filter output LPF_O by an inverse of the sampling frequency 1/fcs of speed control operation. The integrator 18b applies integration arithmetic operation to the multiplied value, and outputs the integrated value to the amplifier 18c. The amplifier 18c multiplies the integrated value that has been input from the integrator 18b by a speed integration gain Gi, and outputs the multiplied value to the adder 18d as integration system output. Then, the adder 18d adds the control system output value that has been input from the amplifier 18a and the integration system output value that has been input from the amplifier 18c, and outputs the added value to the DC motor driver 3 as drive signals DRV.

The drive control processing of the DC motor after replacement is completed to be performed in the motor drive system 1 of the embodiment is described with reference to FIG. 1. According to the above-mentioned configuration, the motor drive system 1 of the embodiment controls the DC motor 4 based on the target rotation position signals when the stepping motor was driven before replacement is completed. The DC motor 4 is replaced as a drive means for a component of the image processing apparatus to which the motor drive system 1 of the embodiment is applied.

As illustrated in FIG. 1, in the motor drive system 1 of the embodiment, first the target rotation position signals for the stepping motor before replacement is completed are input from a processor of the image processing apparatus to which the system is applied, to the target position generator 11 in the motor control unit 2 of the motor control device 10, for example.

Then, the target position generator 11 generates target rotation position information XTGT for the DC motor 4 based on the target rotation position signals (pulse signals CLK and direction signals DIR) for the stepping motor before replacement is completed. The target position generator 11 outputs the generated target rotation position information XTGT to the difference unit 12 and the speed predictor 15.

The actual position detector 19 generates actual position information XDET that is a count value representing a rotation position 6 of the rotation shaft of the DC motor 4, based on the rotation position information (i.e., biphase pulse signals EA and EB) that have been input from the encoder 5 that detects rotation of the rotation shaft of the DC motor 4. The actual position detector 19 outputs the generated actual position information XDET to the actual speed detector 16 and the difference unit 12.

The target rotation position information XTGT from the target position generator 11 and the actual position information XDET from the actual position detector 19 are input to the difference unit 12.

The difference unit 12 calculates a difference between the target rotation position information XTGT that has been input from the target position generator 11 and the actual position information XDET that has been input from the actual position detector 19, and outputs the difference value to the position controller 13 as position error information XERR.

Then, the position controller 13 multiplies the position error information XERR that has been input from the difference unit 12 by a position gain Gp, and outputs the multiplied value to the adder/subtractor 14 as target speed information VTGT.

The speed predictor 15 multiplies the target rotation position information XTGT that has been input from the target position generator 11 by the sampling frequency fs. As a result, the speed predictor 15 delays the multiplied value by time period for one sample, and calculates a difference between the multiplied value before delaying by time period for one sample and the current multiplied value. The speed predictor 15 multiplies the difference value obtained by calculation by the FF gain Gff to generate speed prediction information VFF using the multiplied value. The speed predictor 15 outputs the generated speed prediction information VFF to the adder/subtractor 14.

The actual speed detector 16 differentiates the actual position information XDET that has been input from the actual position detector 19 to generate actual speed information VDET using the derivative, and outputs the generated actual speed information VDET to the adder/subtractor 14.

Thus, the target speed information VTGT from the position controller 13, the speed prediction information VFF from the speed predictor 15, and the actual speed information VDET from the actual speed detector 16 are input to the adder/subtractor 14.

Then, the adder/subtractor 14 adds the target speed information VTGT that has been input from the position controller 13, adds the speed prediction information VFF that has been input from the speed predictor 15, and subtracts the actual speed information VDET that has been input from the actual speed detector 16. The adder/subtractor 14 outputs the added/subtracted value obtained by calculation to the LPF 17 as speed error information VERR.

Then, the LPF 17 smooths the speed error information VERR that has been input from the adder/subtractor 14, and outputs filter output LPF_O to the speed controller 18.

Then, the speed controller 18 multiplies the filter output LPF_O that has been input from the LPF 17 by a speed proportional gain Gc to obtain the multiplied value as a value of control system output. The speed controller 18 multiplies the filter output LPF_O by an inverse of a sampling frequency 1/fcs of speed control operation, and applies integration arithmetic operation to the multiplied value. Thereafter, the speed controller 18 multiplies the integrated value by a speed integration gain Gi, and sets the multiplied value as a value of integration system output. The speed controller 18 adds the control system output value and the integration system output value, which are obtained in the above manner. The speed controller 18 outputs the added value to the DC motor driver 3 as drive signals DRV.

The drive signals DRV from the motor control unit 2 are input to the DC motor driver 3.

Then, the DC motor driver 3 applies drive voltage to the coil terminal of the DC motor 4. The drive voltage varies according to the drive signals DRV that has been input from the speed controller 18 of the motor control unit 2. The DC motor driver 3 drives the DC motor 4 at the target rotation position.

As described above, in the motor drive system 1 of the embodiment, the motor control device 10 including the motor control unit 2 and the DC motor driver 3 controls the DC motor 4 replaced with the stepping motor. More specifically, the motor control unit 2 may include the target position generator 11, the difference unit 12, the position controller 13, the adder/subtractor 14, the speed predictor 15, the actual speed detector 16, the LPF 17, and the speed controller 18, for example. The motor control unit 2 performs controls drive of the DC motor 4 in the following manner. First, the motor control unit 2 generates, with the target position generator 11, target rotation position information XTGT for the DC motor 4 after replacement is completed based on the target rotation position signals (i.e., pulse signals CLK and direction signals DIR) for the stepping motor before replacement is completed. Next, the motor control unit 2 generates, with the speed predictor 15, speed prediction information VFF of the DC motor 4 based on the target rotation position information XTGT. Then, the motor control unit 2 generates, with the actual position detector 19, actual position information XDET indicating an actual rotation position of the DC motor 4 based on the rotation position information (i.e., biphase pulse signals EA and EB) detected by the encoder 5 as a rotation position of the DC motor 4. Then, the motor control unit 2 generates, with the actual speed detector 16, actual speed information VDET indicating an actual rotation speed of the DC motor 4 based on the actual position information XDET. Subsequently, the motor control unit 2 generates, with the difference unit 12 and the position controller 13, target speed information VTGT indicating a target rotation speed for correcting an erroneous difference between the target rotation position and the actual rotation position, based on the target rotation position information XTGT and the actual position information XDET. Next, the motor control unit 2 generates, with the adder/subtractor 14, speed error information VERR indicating an erroneous difference between the target rotation speed and the actual rotation speed, based on the target speed information VTGT, the speed prediction information VFF, and the actual speed information VDET. Then, the motor control unit 2 smooths the speed error information VERR with the LPF 17, and generates filtered output LPF_O. Then, the motor control unit 2 generates, with the speed controller 18, drive signals DRV for controlling drive of the DC motor 4 based on the filtered output LPF_O. As a result, the motor control unit 2 outputs the generated drive signals DRV to the DC motor driver 3. Then, the DC motor driver 3 outputs drive voltage in accordance with the drive signals DRV to the DC motor 4. Consequently, the DC motor 4 after replacement is completed is driven to rotate.

In the motor drive system 1 of the embodiment, when the stepping motor is replaced with the DC motor 4 that can be driven to rotate with high efficiency, the DC motor 4 after replacement is completed can be driven using the target rotation position signals for the stepping motor before replacement is completed.

The motor control device 10 of the embodiment smooths waveform that varies in a pulse-like manner and corresponds to output waveforms of the speed prediction information VFF and the actual speed information VDET through filtering with the LPF 17, so that the steep angle of waveform can be mitigated. Thus, the motor drive system 1 of the embodiment can prevent the deterioration of accuracy of motor control caused by periodical disturbance of speed control calculation result due to the steep angle of the waveforms. Moreover, the motor drive system 1 of the embodiment can prevent missing of feedback information due to aliasing in sampling, so that the deterioration of accuracy of motor control is prevented.

The drive control of the stepping motor is different from that of the DC motor 4. Thus, when the component 6 driven by the stepping motor is driven by the DC motor 4, it is required to change the target rotation position information XTGT from one for the stepping motor to one for the DC motor 4. This makes the cost of an application system higher. For example, when the specification of the target rotation position information XTGT is changed from one for the stepping motor to one for the DC motor 4, it is necessary to change a device for controlling motor drive and a device for generating control information to be used for controlling the motor drive. The cost required for the change increases accordingly.

Then, the motor control device 10 of the embodiment is configured so that when the stepping motor is replaced with the DC motor 4, there is no need of changing a device for controlling motor drive and a device for generating control information to be used for controlling the motor drive. More specifically, in the motor control device 10 of the embodiment, the speed predictor 15 of the motor control unit 2 differentiates target rotation position information XTGT to generate speed prediction information VFF. The adder/subtractor 14 of the motor control unit 2 selectively adds and subtracts the target speed information VTGT, the speed prediction information VFF, and the actual speed information VDET to generate speed error information VERR. Moreover, in the motor control device 10 of the embodiment, the target position generator 11 of the motor control unit 2 determines a variation direction based on pulse signals in the pulse signal sequence of target rotation position signals (i.e., signal sequence in combination of pulse signals CLK and direction signals DIR) for the stepping motor. The target position generator 11 of the motor control unit 2 counts the number of pulse signals in other pulse signal sequence during a variation direction being stable based on the determination result, and generates target rotation position information XTGT for the DC motor 4 by setting the count value as a variation amount of target rotation position.

Thus, in the motor drive system 1 of the embodiment, even when the stepping motor is replaced with the DC motor 4, there is no need of changing a device for controlling motor drive and a device for generating control information to be used for controlling the motor drive. Consequently, the motor control device 10 of the embodiment can significantly decrease the cost of the motor control system, so that the apparatus to which the system is applied can be provided at lower price.

The motor control device 10 of the embodiment is provided with the LPF 17 which performs filtering subsequent to the operation of information used for controlling rotation speed of the DC motor 4, which include the target speed information VTGT, the speed prediction information VFF, and the actual speed information VDET. Consequently, the motor drive system 1 of the embodiment can achieve an arithmetic circuit performing filtering with a minimum configuration, so that the motor control can be performed at much lower cost.

Alternatively, a modified embodiment of the present invention will be described below. The above-mentioned embodiment have been described as an example in which the pulse signals indicating a variation amount of the target rotation position and the direction signals indicating a variation direction of the variation amount of the target rotation position are output to the motor control unit of the motor control device as target rotation position signals for the stepping motor before replacement is completed. The present embodiment will be described as an example in which target rotation position signals having different signal (format) specifications, in which there are a plurality of specifications of target rotation position signals for the stepping motor, are output. The components different from those of the above-mentioned embodiment are described below. The same components as the above-mentioned embodiment are referred to as the same symbols, and the description thereof are omitted or simplified.

Figure 9:
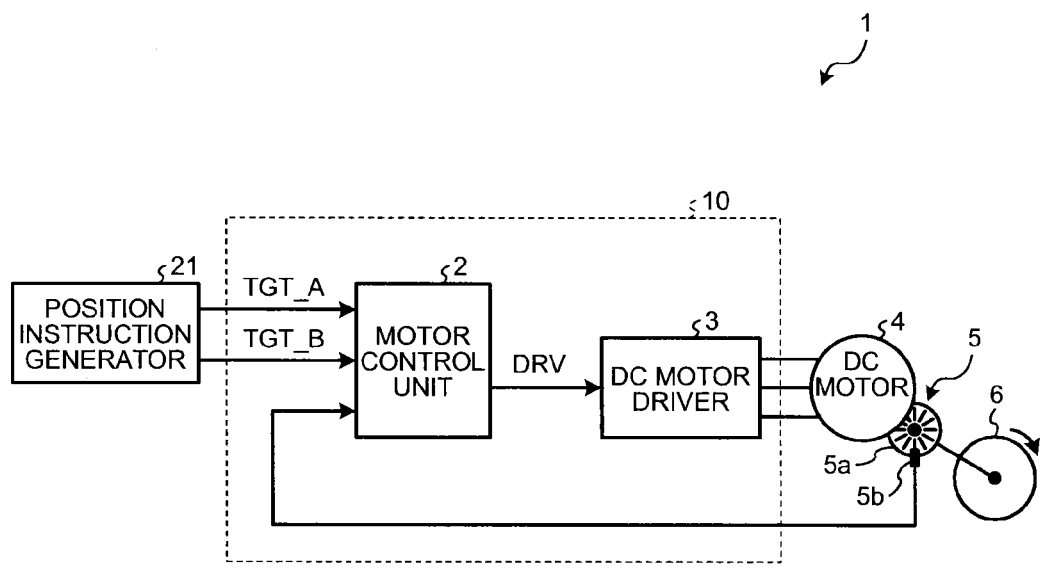
FIG. 9 is a schematic system configuration diagram of a motor drive system according to alternative embodiment of the present invention.

FIG. 9 shows a system configuration of the motor drive system 1 of the present embodiment. The motor drive system 1 of the present embodiment includes the motor control unit 2, the DC motor driver 3, the DC motor 4, and the encoder 5 as illustrated in FIG. 9. The motor control unit 10 of the present embodiment includes, for example, the motor control unit 2 and the DC motor driver 3.

A position instruction generator 21, for example, represents a processor of a device to which the motor drive system 1 of the embodiment is applied. The position instruction generator 21 transmits an instruction of a target rotation position to a stepping motor driver before replacement is completed (not illustrated) by outputting target rotation position signals TGT_A and TGT_B indicating the target rotation position. Then, in the motor drive system 1 of the present embodiment, the motor control unit 2 of the motor control device 10 receives the instruction of the target rotation position. That is, the target rotation position signals TGT_A and TGT_B in which each of signals has different signal specification are input to the motor control device 10 of the embodiment as the instruction of the target rotation position.

Figure 10:
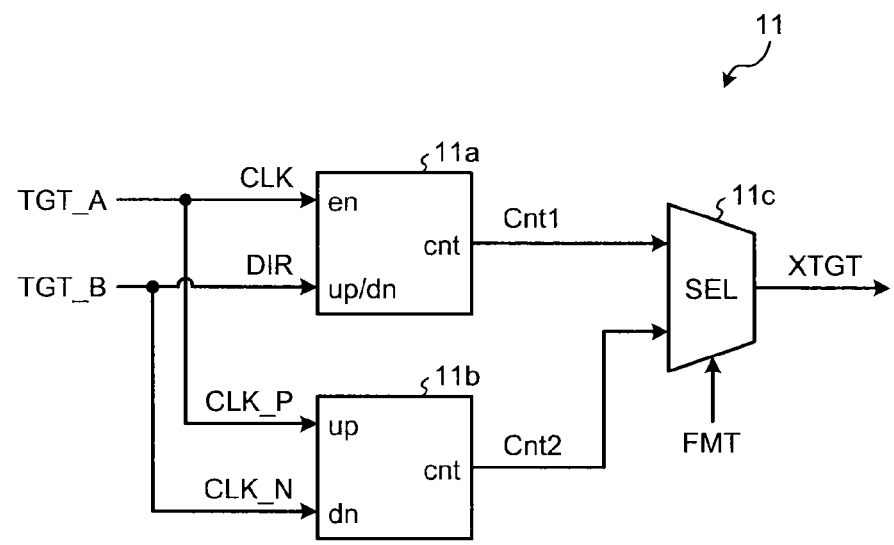
FIG. 10 is a schematic circuit diagram of a target position generator in the alternative embodiment illustrated in FIG. 9.

The motor control unit 2 of the present embodiment is different from that of the above-mentioned embodiment at the point of the configuration of the target position generator 11. FIG. 10 shows a circuit of the target position generator 11 of the present embodiment. The target position generator 11 of the present embodiment includes, for example, a first up/down counter 11a, a second up/down counter 11b, and a selector 11c as illustrated in FIG. 10. The each target rotation position signals TGT_A and TGT_B that have been output from the position instruction generator 21, are input to the first up/down counter 11a and the second up/down counter 11b.

The first up/down counter 11a receives the target rotation position signals TGT_A that has been input from the position instruction generator 21 as pulse signals CLK indicating a variation amount of the target rotation position. The first up/down counter 11a also receives the target rotation position signals TGT_B as direction signals DIR indicating a variation direction of the variation amount of the target rotation position. Then, the first up/down counter 11a performs upcount leading edges of the target rotation position signals TGT_A corresponding to the pulse signals CLK in accordance with H (high) of the target rotation position signals TGT_B corresponding to the direction signals DIR, and performs downcount leading edges in accordance with L (low) of the target rotation position signals TGT_B. Then, the first up/down counter 11a outputs the count result to the selector 11c as first target rotation position information Cnt1.

Figure 11:
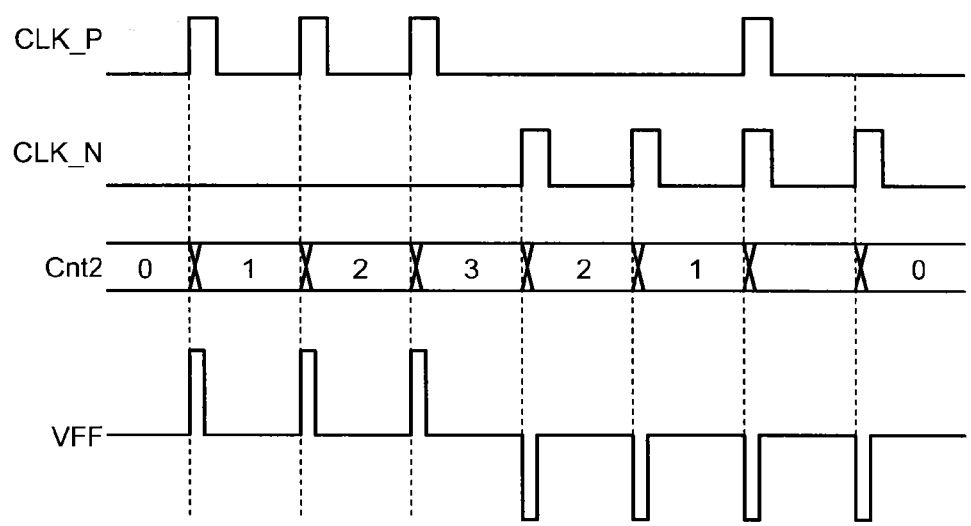
FIG. 11 is an exemplary timing chart for explaining processing for generating target rotation position information and speed prediction information of a DC motor in the alternative embodiment illustrated in FIG. 9.

FIG. 11 shows a process for generating second target rotation position information by the second up/down counter 11b of the present embodiment. The second up/down counter 11b receives the target rotation position signals TGT_A that has been input from the position instruction generator 21 as positive-side pulse signals CLK_P as illustrated in FIG. 11. The second up/down counter 11b also receives the target rotation position signals TGT_B as negative-side pulse signals CLK_N. Then, the second up/down counter 11b performs upcount leading edges of the target rotation position signals TGT_A corresponding to the positive-side pulse signals CLK_P, and performs downcount leading edges of the target rotation position signals TGT_B corresponding to the negative-side pulse signals CLK_N. When the target rotation position signals TGT_A and TGT_B are input at the same time, the second up/down counter 11b does not count them. The second up/down counter 11b outputs the count result to the selector 11c as second target rotation position information Cnt2. When a predetermined rotation direction of the stepping motor before replacement is completed is positive direction, the positive-side pulse signals CLK_P represent signals in which the number of pulses indicates a variation amount in a positive direction of the target rotation position. On the other hand, the negative-side pulse signals CLK_N represent signals in which the number of pulses indicates a variation amount in a negative direction opposite to the positive direction of the target rotation position.

The target rotation position signals TGT_A and TGT_B of the present embodiment represent a plurality of pulse signal sequences in which pulse signal sequence consists of a plurality of pulse signals each having different specifications with time domain are combined. Moreover, the target rotation position signals TGT_A and TGT_B include signals in combination of the positive-side pulse signal sequence CLK_P in which the number of pulses indicates a variation amount in a positive direction of the target rotation position and the negative-side pulse signal strings CLK_N in which the number of pulses indicates a variation amount in a negative direction of the target rotation position.

Thus, the target position generator 11 of the present embodiment performs the following processing according to specifications of target rotation position signals for the stepping motor. The target position generator 11 of the embodiment determines a variation direction of a variation amount of the target rotation position based on values (H/L) of pulse signals in a predetermined pulse signal sequence among a plurality of pulse signal sequences of target rotation position signals (i.e., signal sequence in combination of signals TGT_A and TGT_B). The target position generator 11 of the present embodiment counts the number of pulses in other pulse signal sequences during the variation direction being stable based on the determination result. The target position generator 11 of the present embodiment may include the first up/down counter 11a and the second up/down counter 11b as counting units.

The first up/down counter 11a outputs the first target rotation position information Cnt1 to the selector 11c, and the second up/down counter 11b outputs the second target rotation position information Cnt2 to the selector 11c. Format signals FMT indicating the specifications of the target rotation position signals that are preliminarily set by an external device (not shown) or software, for example, are input to the selector 11c. Thus, the selector 11c selects either the first target rotation position information Cnt1 or the second target rotation position information Cnt2 based on a value of the format signals FMT, and sets the selected information as target rotation position information XTGT for the DC motor 4. For example, the selector 11c selects the first target rotation position information Cnt1 when the format signal FMT indicates "0", and selects the second target rotation position information Cnt2 when the format signal FMT indicates "1". The target position generator 11 of the present embodiment generates target rotation position information XTGT for the DC motor 4 after replacement is completed. Thereafter, the target position generator 11 outputs the target rotation position information XTGT for the DC motor 4 to the difference unit 12 and the speed predictor 15.

Thus, even when the position instruction generator 21 inputs to the target position generator 11a plurality of target rotation position signals TGT_A and TGT_B having different specifications, the motor control unit 2 of the present embodiment can generate target rotation position information XTGT for the DC motor 4 after replacement is completed in accordance with the specifications of the input target rotation position signals TGT_A and TGT_B, so that the subsequent processing is performed.

As described above, in the motor drive system 1 of the present embodiment, the motor control unit 2 of the motor control device 10 generates, with the target position generator 11, target rotation position information XTGT for the DC motor 4 after replacement is completed based on the target rotation position signals TGT_A and TGT_B for the stepping motor before replacement is completed. Here, the target position generator 11 of the present embodiment determines a variation direction of a variation amount of the target rotation position based on values (H/L) of pulse signals in a predetermined pulse signal sequences, in accordance with the specifications of the signals, among a plurality of pulse signals strings TGT_A and TGT_B having different signal specifications of target rotation position signals for the steeping motor. The target position generator 11 of the present embodiment counts the number of pulses in other pulse signal strings during the variation direction being stable based on the determination result, and generates, based on the count value, first target rotation position information Cnt1 and second target rotation position information Cnt2 in accordance with the specifications of the respective signals. The target position generator 11 of the embodiment selects either the first target rotation position information Cnt1 or the second target rotation position information Cnt2 based on the predetermined format signals FMT indicating the specifications of the target rotation position signals, and sets the selected information as target rotation position information XTGT for the DC motor 4.

Thus, even when the stepping motor is replaced with the DC motor 4 that can be driven to rotate with high efficiency, the motor drive system 1 of the embodiment can drive the DC motor 4 after replacement is completed using target rotation position signals having different signal specifications for the stepping motor before replacement is completed. That is, the motor drive system 1 of the present embodiment can drive the DC motor 4 after replacement is completed without changing the position instruction generator 21 originally used.

The invention exerts an effect of preventing the deterioration of accuracy of motor control due to replacement of motors.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A motor control device, comprising:
   circuitry configured as
      a unit configured to generate target rotation position information of a first driving motor based on a plurality of pulse signal sequences indicating a target rotation position of a second driving motor, the second driving motor being replaced with the first driving motor; and
      a unit configured to generate speed control signals of the first driving motor based on the target rotation position information.

2. The motor control device set forth in claim 1, wherein the unit configured to generate target rotation position information generates the target rotation position information based on a number of pulse signals in a predetermined pulse signal sequence among the pulse signal sequences and based on a value of a pulse signal in another pulse signal sequence among the pulse signal sequences.

3. The motor control device set forth in claim 1, wherein when a predetermined value of a predetermined pulse signal sequence among the pulse signal sequences is detected, the unit configured to generate target rotation position information counts a number of pulse signals in another pulse signal sequence among the pulse signal sequences and generates, as the target rotation position information, a value obtained by incrementing or decrementing a count value of the number of pulse signals in the another pulse signal sequence.

4. The motor control device set forth in claim 1, wherein the circuitry is further configured as a unit to select, from among a plurality of pieces of the tar et rotation position information having different specifications, a piece of the tar et rotation position information in accordance with a signal specification of the target rotation position information.

5. An image processing apparatus, comprising:
   the motor control device set forth in claim 1;
   a mechanism disposed in the image processing apparatus; and
   the motor control device controlling rotation of the first driving motor to perform image processing by movement of the mechanism being driven with the first driving motor.

6. The motor control device set forth in claim 1, wherein the circuitry is further configured as a unit configured to generate actual position information indicating an actual rotation position of the first driving motor;

a unit configured to generate actual speed information indicating an actual rotation speed of the first driving motor based on the actual position information;

a unit configured to generate target speed information indicating a target rotation speed for correcting an error between the target rotation position and the actual rotation position of the first driving motor based on the target rotation position information and the actual position information;

a unit configured to generate speed error signals indicating an error between the target rotation speed and the actual rotation speed of the first driving motor based on the target speed information and the actual speed information; and a unit configured to generate speed control signals of the first driving motor based on the speed error signals.

7. The motor control device set forth in claim 6, wherein the circuitry is further configured as a unit configured to generate speed prediction information of the first driving motor based on the target rotation position information, wherein the unit configured to generate speed error signals generates the speed error signals based on the speed prediction information, the target speed information and the actual speed information.

8. The motor control device set forth in claim 7, wherein the unit configured to generate speed prediction information generates the speed prediction information by differentiating the target rotation position information.

9. The motor control device set forth in claim 8, wherein the circuitry is further configured as a unit configured to smooth the speed error signals and generate smoothed speed error signals.

10. The motor control device set forth in claim 7, wherein the unit configured to generate speed error signals selectively adds and subtracts the target speed information, the speed prediction information, and the actual speed information, and sets a calculation value as the speed error signals.

11. The motor control device set forth in claim 7, wherein the circuitry is further configured as a unit configured to smooth the speed error signals and generate smoothed speed error signals.

12. The motor control device set forth in claim 6, wherein the circuitry is further configured as a unit configured to smooth the speed error signals and generate smoothed speed error signals.

13. A method for operating a motor control device, comprising:

generating target rotation position information of a first driving motor based on a plurality of pulse signal sequences indicating a target rotation position of a second driving motor, the second driving motor being replaced with the first driving motor; and generating speed control signals of the first driving motor based on the target rotation position information.

14. A motor control device, comprising:

circuitry configured as a unit configured to generate target rotation position information of a direct current motor based on a plurality of pulse signal sequences indicating a target rotation position of a stepping motor; and a unit configured to generate speed control signals of the direct current motor based on the target rotation position information, wherein the unit configured to generate target rotation position information generates the target rotation position information based on a number of pulse signals in a predetermined pulse signal sequence among the pulse signal sequences and based on a value of a pulse signal in another pulse signal sequence among the pulse signal sequences.

15. The motor control device set forth in claim 14, wherein the circuitry is further configured as a unit to select, from among a plurality of pieces of the target rotation position information having different specifications, a piece of the target rotation position information in accordance with a signal specification of the target rotation position information.

16. The motor control device set forth in claim 14, wherein the circuitry is further configured as a unit configured to generate actual position information indicating an actual rotation position of the direct current motor;

a unit configured to generate actual speed information indicating an actual rotation speed of the direct current motor based on the actual position information;

a unit configured to generate target speed information indicating a target rotation speed for correcting an error between the target rotation position and the actual rotation position of the direct current motor based on the target rotation position information and the actual position information;

a unit configured to generate speed error signals indicating an error between the target rotation speed and the actual rotation speed of the direct current motor based on the target speed information and the actual speed information; and a unit configured to generate speed control signals of the direct current motor based on the speed error signals.

17. The motor control device set forth in claim 16, wherein the circuitry is further configured as a unit configured to generate speed prediction information of the direct current motor based on the target rotation position information, wherein the unit confinured to generate speed error signals generates the speed error signals based on the speed prediction information, the target speed information and the actual speed information.

18. An image processing apparatus, comprising:

the motor control device set forth in claim 14;

a mechanism disposed in the image processing apparatus; and the motor control device controlling rotation of the direct current motor to perform image processing by movement of the mechanism being driven with the direct current motor.

19. A motor control device, comprising:

circuitry configured as a unit configured to generate target rotation position information of a direct current motor based on a plurality of pulse signal sequences indicating a target rotation position of a stepping motor; and a unit configured to generate speed control signals of the direct current motor based on the target rotation position information, wherein when a predetermined value of a predetermined pulse signal sequence among the pulse signal sequences is detected, the unit configured to generate target rotation position information counts a number of pulse signals in another pulse signal sequence among the pulse signal sequences and generates, as the target rotation position information, a value obtained by incrementing or decrementing a count value of the number of pulse signals in the another pulse signal sequence.

* * * * *